United States Patent [19]

Schubert

[11] Patent Number: 4,929,064
[45] Date of Patent: May 29, 1990

[54] OPTICAL COMMUNICATIONS MODULATOR DEVICE

[75] Inventor: Erdmann F. Schubert, New Providence, N.J.

[73] Assignee: American Telephone and Telegraph Company, New York, N.Y.

[21] Appl. No.: 222,603

[22] Filed: Jul. 21, 1988

[51] Int. Cl.$^5$ .............................................. G02F 1/015
[52] U.S. Cl. .................................... 350/355; 350/356; 455/611
[58] Field of Search ...................... 350/355, 356, 96.14, 350/96.13, 353; 357/4; 455/600, 605, 611

[56] References Cited

U.S. PATENT DOCUMENTS

| | | | |
|---|---|---|---|
| 3,158,746 | 11/1964 | Lehovec | 350/355 |
| 3,882,533 | 5/1975 | Dohler | 357/58 |
| 4,518,934 | 5/1985 | Venkatesan | 350/355 X |
| 4,561,718 | 12/1985 | Nelson | 350/96.14 |
| 4,579,417 | 4/1986 | Ih | 350/96.14 X |
| 4,784,476 | 11/1988 | Schulman et al. | 350/355 |

OTHER PUBLICATIONS

*Applied Physics Letters*, vol. 50 (1987), "Tunable Electroabsorption in Gallium Arsenide Doping Superlattices", C. J. Chang-Hasnain, G. Hasnain, N. M. Johnson, G. H. Dohler, J. N. Miller, J. R. Whinnery, and A. Dienes, pp. 915–917.

*Physical Review B*, vol. 32 (1985), "Radiative Electron-Hole Recombination in a New Sawtooth Semiconductor Superlattice Grown by Molecular-Beam Epitaxy", E. F. Schubert, Y. Horikoshi, and K. Ploog, pp. 1085–1089.

*IEEE Transactions on Electron Devices*, vol. ED-33 (1936), "The Delta-Doped Field-Effect Transistor (δFET)", Erdmann F. Schubert, A. Fischer, and Klaus Ploog, pp. 625–632.

*Applied Physics Letters*, vol. 52 (1988), "Spatial Localization of Impurities in Delta-Doped n-Type GaAs", E. F. Schubert, J. B. Stark, B. Ullrich, and J. E. Cunningham, pp. 1508–1510.

*Primary Examiner*—Eugene R. LaRoche
*Assistant Examiner*—Nathan McCutcheon
*Attorney, Agent, or Firm*—Peter A. Businger

[57] ABSTRACT

Electromagnetic radiation is modulated in response to an electrical signal which produces a variable electric field in a semiconductor δ-doped structure. A resulting device has a desirably broad wavelength range in which light intensity can be modulated, large contrast ratio between transparent and opaque states, small operating voltage, and high-speed capability as desirable in optical communications applications.

10 Claims, 2 Drawing Sheets

OPTICAL COMMUNICATIONS MODULATOR DEVICE

TECHNICAL FIELD

The invention is concerned with the modulation and switching of electro-magnetic radiation in response to an electrical signal in optical communications.

BACKGROUND OF THE INVENTION

As an important aspect of optical communications, the modulation and switching especially of near-infrared radiation has received considerable attention; of particular current importance is the modulation of such radiation by means of an electrical signal. Modulation may take the form of direct intensity modulation of a light source; alternatively, means are desired for indirect modulation, e.g., as applied to radiation from a source having essentially constant intensity. One such indirect modulation device, disclosed by C. J. Chang-Hasnain et al., "Tunable Electroabsorption in Gallium Arsenide Doping Superlattices", Applied Physics Letters, Vol. 50 (1987), pp. 915–917, is based on the use of a superlattice of gallium arsenide semiconductor layers which, in groups of four, are n-doped, intrinsic, p-doped, and intrinsic. The invention as disclosed below is motivated by the desire for providing a semiconductor modulator device having improved absorption characteristics as well as enhanced bias capability.

Further considered as relevant with respect to the invention are the papers by E. F. Schubert et al.,

[1] "Radiative Electron-Hole Recombination in a New Sawtooth Semiconductor Superlattice Grown by Molecular-beam Epitaxy", Physical Review B, Vol. 32 (1985), pp. 1085–1089,

[2] "The Delta-doped Field-effect Transistor (δFET)", IEEE Transactions of Electron Devices, Vol. ED-33 (1986), pp. 625–632, and

[3] "Spatial Localization of Impurities in Delta-doped n-type GaAs", Applied Physics Letters, Vol. 52 (1988), pp. 1508–1510.

SUMMARY OF THE INVENTION

Electromagnetic radiation as may be used in optical communications is modulated in response to an electrical signal which produces a variable electric field in a semiconductor layered structure. In a preferred embodiment an essentially undoped semiconductor material is used as epitaxially deposited on a suitable substrate, with interleaved thin, heavily doped donor (n-type) and acceptor (p-type) regions. For optimal modulation preferred light incidence is essentially perpendicular to the layered structure; other directions, including parallel incidence are not precluded.

A resulting device has a broad wavelength range in which light intensity can be modulated, a desirably large contrast ratio between transparent and opaque states, operating voltages which are in a range as typically used in electronic integrated circuitry, and high-speed (e.g., GHz) capability.

DETAILED DESCRIPTION

Figure 1:
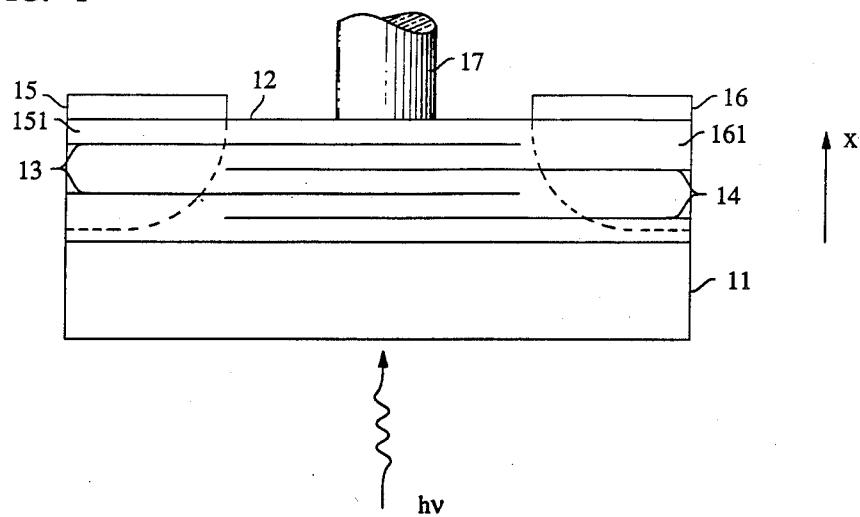
FIG. 1 is a schematic side view of a modulator device in accordance with a preferred embodiment of the invention.

FIG. 1 shows substrate 11, epitaxially deposited semiconductor material 12, n-type doped regions layers 13, p-type doped regions 14, electrical contacts 15 and 16, and optical fiber 17. Contact material is shown diffused into the semiconductor material, thereby forming diffused areas 151 and 161. When a suitable (modulating) voltage is applied between contacts 15 and 16, absorption of incident electromagnetic radiation of energy $h\nu$ in the layered structure varies as a function of such voltage, resulting in the insertion of intensity-modulated radiation into optical fiber 17.

Among suitable semiconductor host materials are binary Group III–V materials such as, e.g., gallium arsenide, ternary and quaternary Group III–V materials such as, e.g., gallium-indium phosphide-arsenide, as well as Group II–VI and Group IV materials. Of importance in the choice of a material is its energy gap $E_g$ and corresponding wavelength $\lambda_g$ in that modulation of a wavelength $\lambda$ of interest requires $\lambda_g < \lambda$. For example, for gallium arsenide, $E_g = 1.424$ eV, $\lambda_g = 870$ nanometer, and a resulting device is suitable for modulation at wavelengths in the approximate range from 900 to 1000 nanometer. For light emitted by a gallium arsenide source a device is preferred including a higher-gap host material such as, e.g. aluminum-gallium arsenide. While, typically, a single semiconductor material is used as host material, use of different materials is not precluded, e.g., in the interest of further broadening of the wavelength response.

Conveniently, semiconductor layers 12 and dopant layers 13 and 14 are deposited sequentially in growth direction x by molecular-beam epitaxy (MBE), other methods such as, e.g., metal-organic chemical vapor deposition (MOCVD) being not precluded. Selective inclusion of dopant material ("δ-doping") so as to facilitate contacting as depicted in FIG. 1 is facilitated by shadow masking techniques.

Typical structural dimensions are such that the distance between doped regions is in the range from 50 to 500 nanometers. Preferred doped-region thickness is less than 10 nanometers and preferably less than 5 nanometers as further discussed below in connection with preferred minimization of impurity absorption. Preferred two-dimensional dopant concentration is in the range from $5 \times 10^{12}$ to $2 \times 10^{13}$ cm$^{-2}$. In the case of Group III–V materials such as, e.g., gallium arsenide, p-type doping may be by means of beryllium, and n-type doping by means of silicon; such dopants will occupy on the order of not more than 5 percent of the gallium sites of a gallium monolayer in the gallium arsenide crystal lattice. Alternatively, p-type doping can be effected by carbon on arsenic sites.

Figure 2:
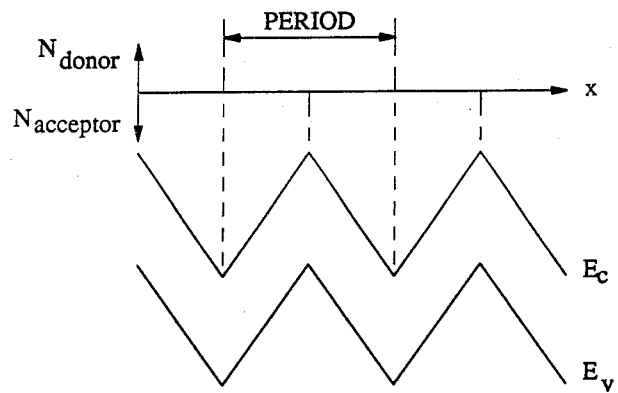
FIG. 2 is a graphic representation of the doping profile and of a resulting energy-band pattern corresponding to the device of FIG. 1.
Figure 3:
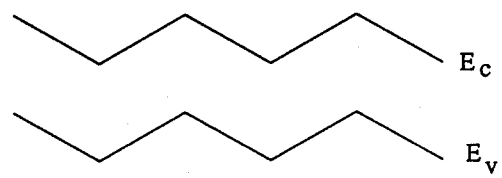
FIG. 3 is a graphic representation of an energy-band pattern corresponding to the device of FIG. 1 under positive bias.
Figure 4:
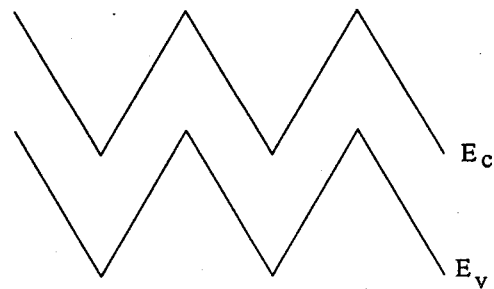
FIG. 4 is a graphic representation of an energy-band pattern corresponding to the device of FIG. 1 under negative bias.

FIG. 2 graphically shows dopant concentrations as a function of the spatial coordinate x (in correspondence with FIG. 1), as well as a resulting zig-zag or sawtooth energy-band pattern including a valence band, a conduction band, and a forbidden region (gap region) between the conduction band and the valence band. The band diagram as depicted in FIG. 2 may be understood as corresponding to zero bias voltage between contacts 15 and 16, the application of a positive or negative bias voltage resulting in a decrease or an increase, respectively, in the peak-to-valley energy difference of the zig-zag pattern as illustrated by respective FIGS. 3 and 4.

Figure 5:
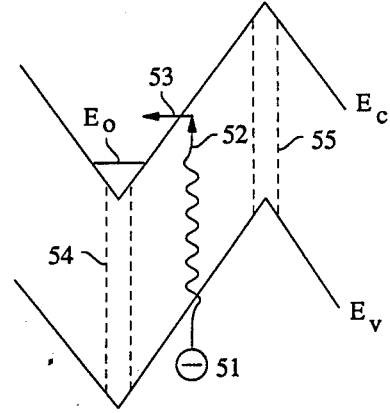
FIG. 5 is a graphic representation of a portion of the energy-band pattern of FIG. 2.

In physical terms, with reference to FIG. 5, device functioning may be described as follows: Light is absorbed by a two-step process termed tunneling-assisted absorption or electroabsorption, involving, first, the excitation of an electron 51 from the valence band of the semiconductor to an intermediate (virtual) state 52 in the forbidden gap, the energy $h\nu$ of the absorbed photon being less than the energy gap of the semiconductor host material. A second step involves tunneling from the intermediate state 52 in the gap to an allowed state 53 in the conduction band of the semiconductor. Tunneling probability is directly dependent on the electric field in the semiconductor, and this field in turn is directly related to the voltage applied to the modulator. Thus, the amounts of tunneling-assisted absorbed light and complementary transmitted light can be controlled by the applied voltage.

Figure 6:
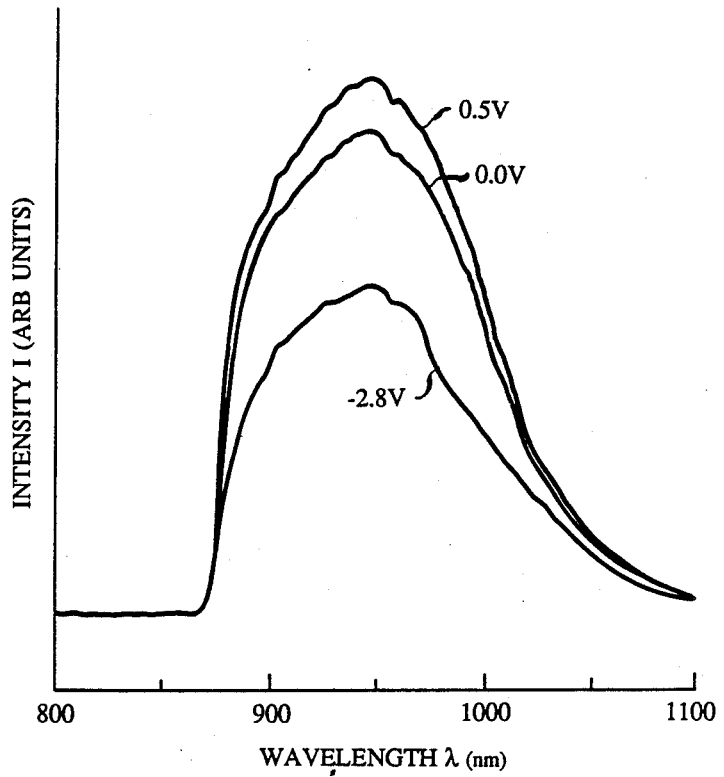
FIG. 6 is a graphic representation of en experimentally determined functional relationship between intensity of light transmitted by a device of FIG. 1 as a function of wavelength and for different bias voltages.

Another important aspect of the invention is related to the prevention of impurity absorption at energies of interest (i.e., energies below the bandgap energy) as such absorption is independent of an applied potential and adversely affects contrast ratio. In this respect, further with reference to FIG. 6, as the region between dopant spikes 54 and 55 is undoped, impurity absorption at energies less than the energy gap $E_g$ is essentially precluded there. Impurity absorption at such energies is precluded also in the doped regions 54 and 55 because of shifting of the lowest energy level $E_O$ in a V-shaped potential well; thus, and in the interest of providing a highly transparent device state, impurity absorption at energies of interest is essentially precluded throughout.

In view of the above discussion of impurity absorption, preferred thickness of doped regions is limited by the spatial extent $z_O$ of the lowest subband of the V-shaped potential well. As discussed in Reference [2] as cited above, such extent may be expressed as $$z_O = \tfrac{1}{2}[h(2mE_O)^{-\tfrac{1}{2}}],$$

where $$E_O = \tfrac{1}{2} 2^{-\tfrac{1}{3}}[e^2h^2N^2/(\epsilon^2 m)]^{\tfrac{1}{3}}$$

is the energy of the lowest eigenstate in a V-shaped potential, e denoting the elementary charge, N the two-dimensional dopant concentration, $\epsilon$ the semiconductor permittivity, and m the effective electron or hole carrier mass. For example, for gallium arsenide with $N = 10^{13}$ cm$^{-2}$: $E_O = 188$ meV and $z_O = 5.4$ nanometers.

EXAMPLE

Gas-source molecular-beam epitaxy was used to deposit a 10-period structure of δ-doped gallium arsenide on a gallium arsenide substrate. The thickness of essentially pure gallium arsenide between dopant "spikes" was approximately 200 nanometers, and doped regions had a thickness of approximately 1 nanometer, with a two-dimensional dopant concentration of approximately $10^{13}$ cm$^{-2}$. Beryllium and silicon were used as respective p- and n-type dopants. The substrate was polished-this in the interest of minimizing scattering of incident radiation. The n- and p-type portions were contacted with respective selectively deposited tin and zinc-gold ohmic contacts which were alloyed at an approximate temperature of 425 degrees C. for approximately 60 seconds.

The resulting device was tested in an experimental setup in which a single-pass ¼-meter monochromator was used to focus light into a multimode silica fiber which was butt-coupled to the device. The transmitted light was detected with a silicon photodiode and amplified using a "lock-in" technique. Results were as graphically depicted in FIG. 4 for different voltages as applied between contacts of the device. It is apparent that significant modulation is achieved over a relatively wide range of wavelengths ($\Delta\lambda > 100$ nanometers) as is desirable, e.g., in optical communications, because no precise matching of light-source wavelength and modulator wavelength is required (as contrasted, e.g., with a modulator device having a wavelength range on the order of a nanometer). The maximum observed contrast ratio between opaque and transparent states is approximately 1:1.7 (or 70 percent) at a wavelength of approximately 950 nanometers. The voltage difference between transparent and opaque states is approximately 3.3 V, such small voltage difference being desirable for integration of the modulator with typical electronic circuitry.

I claim:

1. In an optical communications system, a modulator device comprising a substrate-supported semiconductor structure,
    said structure comprising a semiconductor material comprising a first plurality of p-type regions commonly contacted by a first contact, and a second plurality of n-type regions commonly contacted by a second contact, said first plurality of regions being interleaved with said second plurality of regions, and
    the thickness of said regions being less than the spatial extent of the lowest subband corresponding to a V-shaped potential well.

2. The device of claim 1 in which the thickness of said regions is less than 10 nanometers.

3. The device of claim 1 in which the distance between said regions is in the range form 50 to 500 nanometers.

4. The device of claim 1 in which dopant concentration in said regions is in the range from $5 \times 10^{12}$ to $2 \times 10^{13}$ cm$^{-2}$ per doped region.

5. The device of claim 1 in which said structure consists essentially of one semiconductor material.

6. The device of claim 5 in which said semiconductor material consists essentially of gallium arsenide.

7. The device of claim 1 in which said structure is on a polished substrate.

8. The device of claim 1, further comprising a source of electromagnetic radiation incident on said device.

9. The device of claim 8, the incidence of said electromagnetic radiation being essentially perpendicular to said regions.

10. The device of claim 1, further comprising an optical fiber adapted to transmit light emanating from said device.

* * * * *